United States Patent
Oliveira et al.

(10) Patent No.: US 7,684,566 B2
(45) Date of Patent: Mar. 23, 2010

(54) ENCRYPTION SCHEME FOR STREAMED MULTIMEDIA CONTENT PROTECTED BY RIGHTS MANAGEMENT SYSTEM

(75) Inventors: Eduardo P. Oliveira, Redmond, WA (US); Geoffrey Dunbar, Kirkland, WA (US); James M. Alkove, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1290 days.

(21) Appl. No.: 11/139,956

(22) Filed: May 27, 2005

(65) Prior Publication Data

US 2006/0280301 A1 Dec. 14, 2006

(51) Int. Cl.
*H04L 9/00* (2006.01)
(52) U.S. Cl. ...................................... 380/212
(58) Field of Classification Search ................. 380/212
See application file for complete search history.

(56) References Cited

U.S. PATENT DOCUMENTS

| | | | | |
|---|---|---|---|---|
| 5,691,768 A | * | 11/1997 | Civanlar et al. | 375/240.01 |
| 5,805,700 A | * | 9/1998 | Nardone et al. | 380/217 |
| 7,434,052 B1 | * | 10/2008 | Rump | 713/171 |
| 2004/0001592 A1 | * | 1/2004 | Akiwumi-Assani et al. | 380/271 |
| 2004/0088557 A1 | * | 5/2004 | Malcolm et al. | 713/193 |
| 2005/0163093 A1 | * | 7/2005 | Garg et al. | 370/342 |
| 2006/0227965 A1 | * | 10/2006 | Zhu et al. | 380/37 |

* cited by examiner

*Primary Examiner*—Andrew L Nalven
(74) *Attorney, Agent, or Firm*—Woodcock Washburn LLP

(57) ABSTRACT

A stream of content has multiple sub-streams, where each sub-stream comprises a part of the content and is divisible into logical blocks bounded by intrinsic partitions. For each sub-stream, a specification of the logical blocks bounded by the intrinsic partitions is defined and the sub-stream is divided into the logical blocks bounded by the intrinsic partitions. Each divided logical block is encrypted and then divided into one or more portions to produce corresponding pieces of data, and each piece of data is placed into a data packet as a payload thereof. Each data packet is transmitted to a recipient thereof, and the recipient can retrieve the pieces of data from the payloads of the packets, reconstruct the encrypted logical blocks, and manipulate the sub-stream on a per-logical block basis without necessarily decrypting each encrypted logical block.

8 Claims, 8 Drawing Sheets

ENCRYPTION SCHEME FOR STREAMED MULTIMEDIA CONTENT PROTECTED BY RIGHTS MANAGEMENT SYSTEM

TECHNICAL FIELD

The present invention relates to an encryption system for encrypting at least a portion of streamed digital content protected by a rights management (RM) system, whereby access to is provided only in accordance with a corresponding digital license. More particularly, the invention relates to an encryption system that allows the encrypted stream to be more easily manipulated.

BACKGROUND OF THE INVENTION

Rights management (RM) and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio and video of a multimedia presentation. Typical modes of distribution of such streamed content include tangible and intangible forms such as an optical disk, a cable-access feed, a feed from an electronic network such as the Internet, a feed from an over-the-air broadcast, etc. Upon being received by a user at an appropriate computing device thereof, such user renders the streamed digital content with the aid of the computing device, appropriate rendering software, and appropriate output devices such as speakers, a video monitor, etc.

In one scenario, the streamed content is distributed by a distributor as part of a subscription service, such as for example a digital television service, and the streamed content as distributed is either protected, such as for example by being encrypted, or is unprotected. If it is the case that the streamed content is indeed distributed in an unprotected form, it may be the case that the distributor primarily intends for the streamed content to be immediately consumed and rendered, and not stored in any meaningful retrievable form. For example, the streamed content may be one of many streams of content in a digital cable television signal that is to be received by a digital cable set-top box and immediately rendered thereby, and is then to be forwarded to the aforementioned appropriate output devices.

However, it is to be appreciated that storage systems exist and/or are being developed that can indeed store the streamed content for later rendering and/or re-distribution to other computing devices. With regard to such storage systems, then, the distributor of the streamed unprotected content would rather not have such unprotected content stored in the unprotected form and without any ability to restrict such re-distribution, if so desired. In particular, the distributor or the like may wish to prohibit the user from copying such streamed content to another storage system or the like, may wish to allow the user to copy with temporal and/or count restrictions, or the like. As may be appreciated, by prohibiting unlimited copying of the streamed content, the distributor can avoid the unchecked dispersal of pristine digital copies of the streamed content, where such unchecked dispersal would encourage other users from foregoing from subscribing to the subscription service offered by such distributor.

In addition, the distributor may wish to provide various users with different rendering rights. For example, the distributor may offer different tiers of service, where higher-level tiers correspondingly command higher subscription fees, and where a user subscribing at a particular tier should not be allowed to access streamed content from higher tiers in an unprotected form.

Note, though, that after the streamed content has been distributed, the distributor has very little if any real control over the streamed content. This is especially problematic in view of the fact that most any personal computer includes the software and hardware necessary to make an exact digital copy of such streamed content, and to download such exact digital copy to a re-distribution medium such as an optical disk, or to send such exact digital copy over a network such as the Internet to any destination.

Of course, as part of a transaction wherein the streamed content is subscribed to, the distributor may require the user/recipient of the streamed content to promise not to re-distribute such content in an unwelcome manner. However, such a promise is easily made and easily broken. The distributor may attempt to prevent such re-distribution through any of several known security devices, usually involving encryption and decryption. However, such security devices if especially simple pose little problem to a mildly determined user who wishes to decrypt encrypted content, save such content in an un-encrypted form, and then re-distribute same.

RM and enforcement architectures and methods have thus been provided to allow the controlled rendering of arbitrary forms of digital content including streamed content, where such control is flexible and definable by the distributor or the like of such digital content. Such architectures allow and facilitate such controlled rendering in the scenario as set forth above.

In one particular arrangement, the streamed content is one of a plurality of streams of such content provided as a combined signal to a receiver. The receiver selects a particular one of the streams upon command from a media system, and provides the selected stream to such media system for further processing. Notably, the selected stream as provided to the receiver is unprotected, but prior to being provided to the media system the selected stream is in fact protected by the receiver according to a particular RM encryption system.

Typically, in an RM encryption system, the content is protected by being encrypted according to a content key (CK). Inasmuch as symmetric encryption and decryption is easier, faster, and less expensive than asymmetric encryption and decryption, such content key (CK) is typically symmetric. Also typically, the content key (CK) is provided by an encrypting entity such as the receiver to a decrypting entity such as the media system in an encrypted form and as part of a digital license or the like that specifies license rules that must be satisfied before such content is allowed to be decrypted and rendered by the decrypting entity/media system.

Typically, a particular stream of content includes multiple sub-streams. For example, a multimedia stream may include an audio sub-stream, a video sub-stream, a text sub-stream, a metadata sub-stream, and/or the like. In addition, such stream may include multiple variations of the same type of sub-stream. For example, such stream may include multiple audio sub-streams, each in a different spoken language, multiple text sub-streams, each in a different written language, and multiple video sub-streams, each from a different angle of view of a scene.

As is known, such a stream with multiple sub-streams is typically sent as a number data packets, where each packet includes one or more payloads, and where each payload corresponds to a contiguous portion of one of the sub-streams of the stream. Thus, a particular sub-stream is re-created by locating the payloads thereof from the packets of the stream and sequentially organizing such located payloads. Note that in the case where the stream is encrypted, and as may also be known, each payload is typically formed and then encrypted as a unit, and thus re-creating the sub-stream includes decrypting each encrypted payload as a unit.

As may be appreciated, each payload from a particular sub-stream has a start boundary and an end boundary. As may also be appreciated, each sub-stream is composed of a number of sequentially organized logical blocks of information. For example, a video sub-stream may be composed of video frames, a text stream may be composed of single- or multi-byte characters, an audio sub-stream may be composed of single- or multi-bit audio units, and the like.

In the prior art, the boundaries of any particular payload were determined rather arbitrarily, and typically based on external factors. For example, to achieve a particular bit rate for a stream, the boundaries of each payload of each sub-stream of the stream were selected to achieve such bit rate, and not based on any consideration of the composition and characteristics of the sub-stream from which the payload originated. Thus, if a particular stream included a video sub-stream based on sequential video frames, such video sub-stream as divided into payloads might be broken up into portions of some arbitrary size selected to achieve the particular bit rate of the stream, where the start boundary of each payload started at some point within a particular video frame, where the payload extended over zero, one or more complete video frames, and where the end boundary of the payload ended at some point within a particular video frame.

Such arbitrary boundaries on payloads are not especially troublesome during normal transmission and rendering of a stream. However, it is to be appreciated that such arbitrary boundaries can cause considerable difficulty when the stream is to be manipulated, such as for example when the above media system wishes to re-transmit the stream to another media system, or to perform other operations on the stream. As but one example, if the payloads in a transmitted stream are defined according to a first bit rate and the stream is to be re-transmitted at a second bit-rate, the payloads should be re-configured to support the second bit-rate. However, performing such re-configuration requires essentially decrypting each payload, forming the entire stream from the decrypted payloads, forming new payloads from the formed stream according to the second bit-rate, encrypting each new payload, and the like before such re-transmission at the second bit-rate can take place. As should be appreciated, such an operation requires expending a tremendous amount of effort as necessitated by the use of arbitrary boundaries for the payloads.

Likewise, if an operation is to be performed on a particular sub-stream on a logical block by logical block basis, performing the operation preliminarily requires decrypting each payload, forming the entire stream from the decrypted payloads, and dividing the formed stream into the logical blocks. As should be appreciated here, such preliminary steps would not be absolutely necessary if the payloads were formed based on the logical blocks of the sub-stream.

A need exists, then, for a method and mechanism by which payloads in a stream of content are defined according to non-arbitrary boundaries. In particular, a need exists for a method and mechanism by which payloads in a stream of content are defined according to rational boundaries that are intrinsic to the underlying sub-stream, and that allow the stream to be manipulated without necessarily requiring the stream to be decrypted and re-encrypted.

In the prior art, the entirety of the content in a stream of content was encrypted according to the content key (CK). However, encrypting all of the content in a stream of content is at times unnecessary and perhaps not even desired. For example, there may be little to be gained by encrypting a text sub-stream in a multimedia stream, and such encryption ay in fact not be desired by the content owner or the like. Moreover, it is to be recognized that it may be desirable to encrypt different sub-streams of a stream differently, for example according to different encryption systems and/or according to different content keys (CK).

A need exists, then, for an architecture that may be employed so that each sub-stream within a stream may be protected according to a particular rights management content protect system and a particular content key (CK). In particular, a need exists for such an architecture to specify within the stream the particular rights management content protection and the particular content key (CK) for each sub-stream of the stream. Specifically, a need exists for such an architecture that describes a header object to be included with the stream that may be interpreted and employed when rendering the stream.

SUMMARY OF THE INVENTION

The aforementioned needs are satisfied at least in part by the present invention in which a method is provided to transmit a stream of content having multiple sub-streams, where each sub-stream comprises a part of the content and is divisible into logical blocks bounded by intrinsic partitions. In the method, for each sub-stream, a specification of the logical blocks bounded by the intrinsic partitions is defined and the sub-stream is divided into the logical blocks bounded by the intrinsic partitions. Each divided logical block is encrypted and then divided into one or more portions to produce corresponding pieces of data, and each piece of data is placed into a data packet as a payload thereof. Each data packet is transmitted to a recipient thereof, and the recipient can retrieve the pieces of data from the payloads of the packets, reconstruct the encrypted logical blocks, and manipulate the sub-stream on a per-logical block basis without necessarily decrypting each encrypted logical block.

The aforementioned needs are also satisfied at least in part by the present invention in which a stream of content has multiple rights management (RM) protected sub-streams therein, where each RM-protected sub-stream is protected according to a different particular protection scheme. The stream includes a data object including data representative of each sub-stream and a header object including an RM description object. The RM description object includes at least one content encryption record, where each content encryption record corresponds to a particular protection scheme and includes with regard to the protection scheme thereof an identification of the protection scheme and at least one encrypted object records. Each encrypted object record relates to a particular sub-stream protected according to the identified protection scheme of the content encryption record thereof and includes an identification of the particular sub-stream. For each RM-protected sub-stream of the stream, an identification of the sub-stream is employed to find a corresponding encrypted object record, and the protection scheme of the content encryption record of the found encrypted object record is employed to render the sub-stream.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
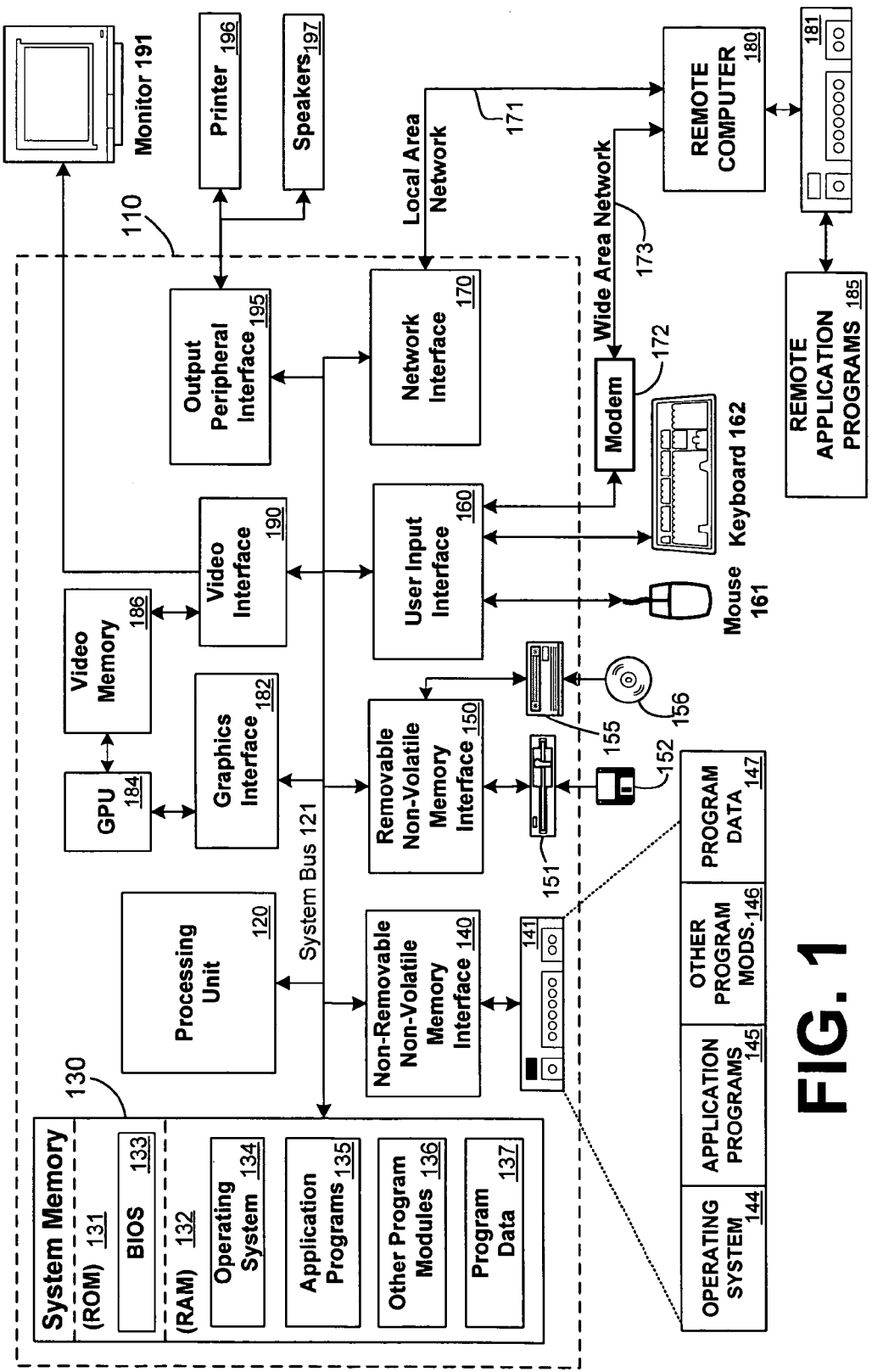
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
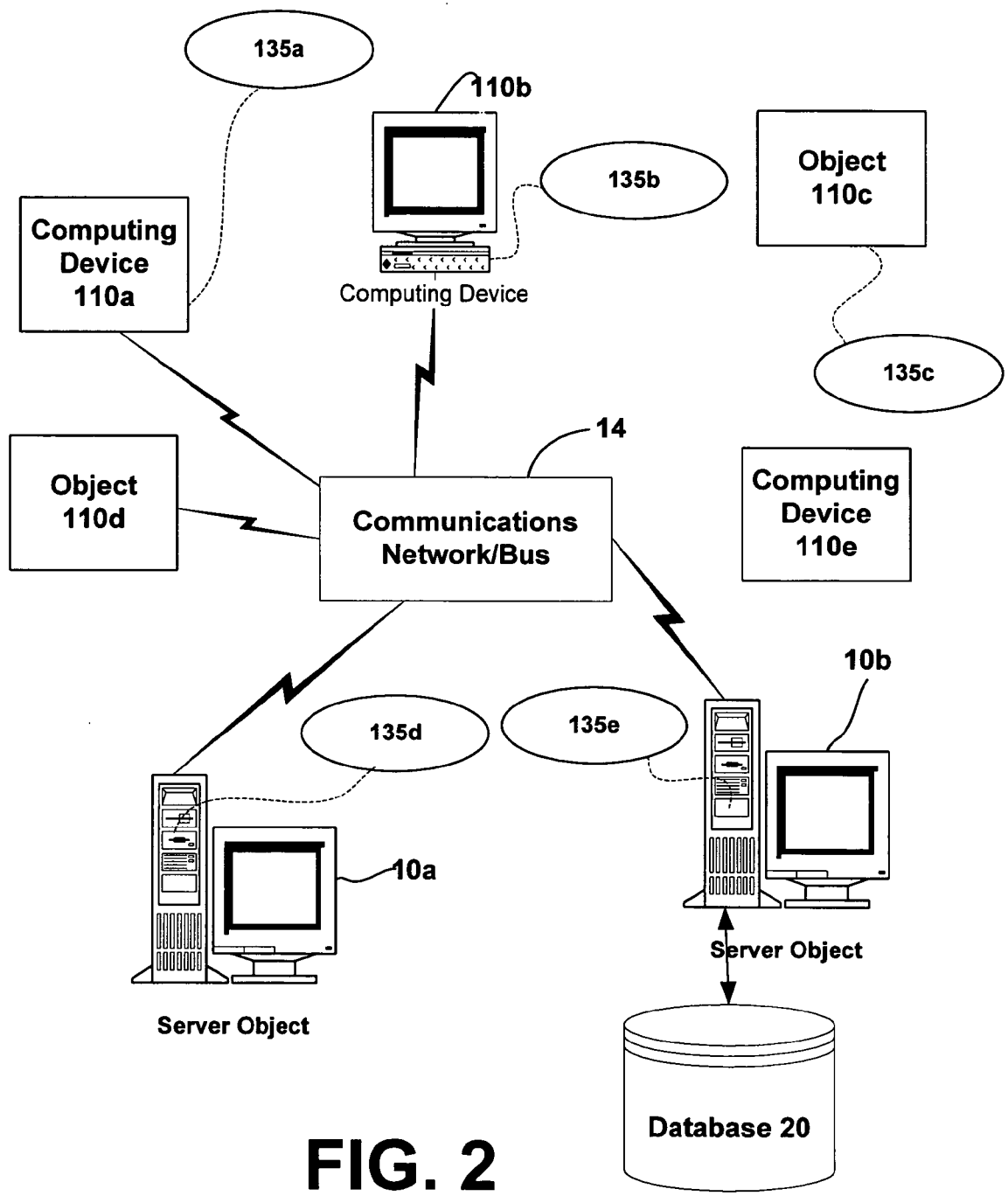
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
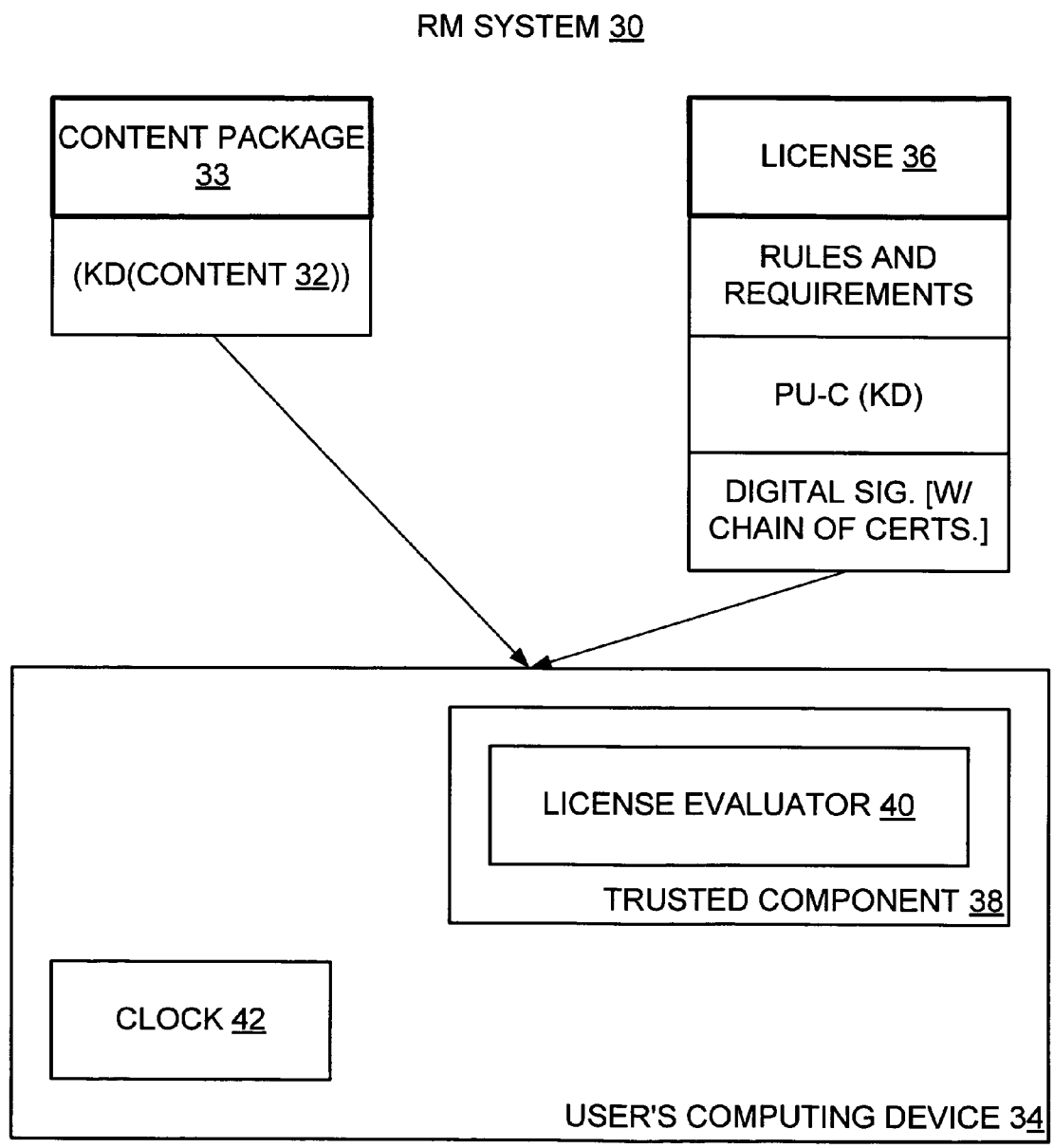
FIG. 3 is a block diagram showing an enforcement architecture of an example of a trust-based system, including a digital license for rendering corresponding digital content in accordance with various embodiments of the present invention.

As is known, and referring now to FIG. 3, rights management (RM) and enforcement is highly desirable in connection with digital content 32 such as digital audio, digital video, digital text, digital data, digital multimedia, etc., where such digital content 32 is to be distributed or redistributed to a user. Upon being received by the user, such user renders the digital content 32 with the aid of an appropriate rendering device such as a media player, text displayer, etc. on a personal computer 34 or the like.

Typically, a content owner or developer or distributor (hereinafter 'distributor') distributing such digital content 32 wishes to restrict what the user can do with such distributed digital content 32, or at least ensure that the content 32 is not redistributed in an unwanted manner. For example, the content distributor may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, and as was set forth above, after distribution has occurred, such distributor has very little if any control over the digital content 32. An RM system 30, then, allows the controlled rendering of arbitrary forms of digital content 32, where such control is flexible and definable by the content distributor of such digital content. Typically, to protect the content 32, such content 32 is encrypted with a symmetric encryption/decryption key (KD), (i.e., (KD(CONTENT))), and is packaged with other information relevant to the content 32 in a package 33.

The trust-based RM system 30 allows a distributor of digital content 32 to specify at least some license rules that must be satisfied before such digital content 32 is allowed to be rendered by a computing device 34 of a user. Such license rules can include the aforementioned temporal requirement, and may be embodied within a digital license or use document (hereinafter 'license') 36 that the user/user's computing device 34 (hereinafter, such terms are interchangeable unless circumstances require otherwise) must be possess. Such license 36 also includes the decryption key (KD) for decrypting the digital content 32, perhaps encrypted according to a key decryptable by the user's computing device 34. As seen in FIG. 3, such encrypting key is a public key of the user's computing device 34 (PU-C), and the user's computing device 34 presumably has the corresponding private key (PR-C) by which (PU-C(KD)) may be decrypted.

The content distributor for a piece of digital content 32 must trust that the user's computing device 34 will abide by the rules and requirements specified by such content owner in the license 36, i.e. that the digital content 32 will not be rendered unless the rules and requirements within the license 36 are satisfied. Preferably, then, the user's computing device 34 is provided with a trusted component or mechanism 38 that will not render the digital content 32 except according to the license rules embodied in the license 36 associated with the digital content 32 and obtained by the user.

The trusted component 38 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 might specify whether the user has rights to render the digital content 32 based on any of several factors, including who the user is, where the user is located, what type of computing device the user is using, what rendering application is calling the RM system 30, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34. If such clock 42 is provided, such clock 42 may be a secure clock 42 that cannot be tampered with by a user in an effort to overcome a temporal restriction of a license 36.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the digital content 32 can then be rendered. In particular, to render the content 32, the decryption key (KD) is obtained from the license 36 and is applied to (KD(CONTENT)) from the content package 33 to result in the actual content 32, and the actual content 32 is then in fact rendered. As set forth above, the license 36 with (PU-C(KD)) in effect authorizes an entity in possession of (PR-C) to access (KD) and thereby access the content 32 encrypted according to such (KD), presuming of course that the entity abides by all conditions as set forth in the license 36.

Note that a license 36 typically includes a digital signature for authentication/validation purposes. Likewise, other forms of digital constructs such as a piece of digital content 32 may also have such a digital signature for authentication/validation purposes. As should be known, such a digital signature may be constructed based on a first key from a pair of asymmetric keys or from a symmetric integrity key, for example by performing some sort of hash on the underlying data to which the signature is attached and then encrypting the hash with the key. Thereafter, the signature is validated by applying the second key from the pair of asymmetric keys or the integrity key, again for example by decrypting the encrypted hash and comparing the decrypted hash to another hash of the underlying data to which the signature is attached. If the hashes match, it can be presumed that the underlying data has not been altered and the underlying construct therefore can be authenticated. Typically, an RM system 30 will not honor a license 36 or the like that is not authenticated.

System for Receiving and Handling Streamed Multimedia Content 32

Figure 4:
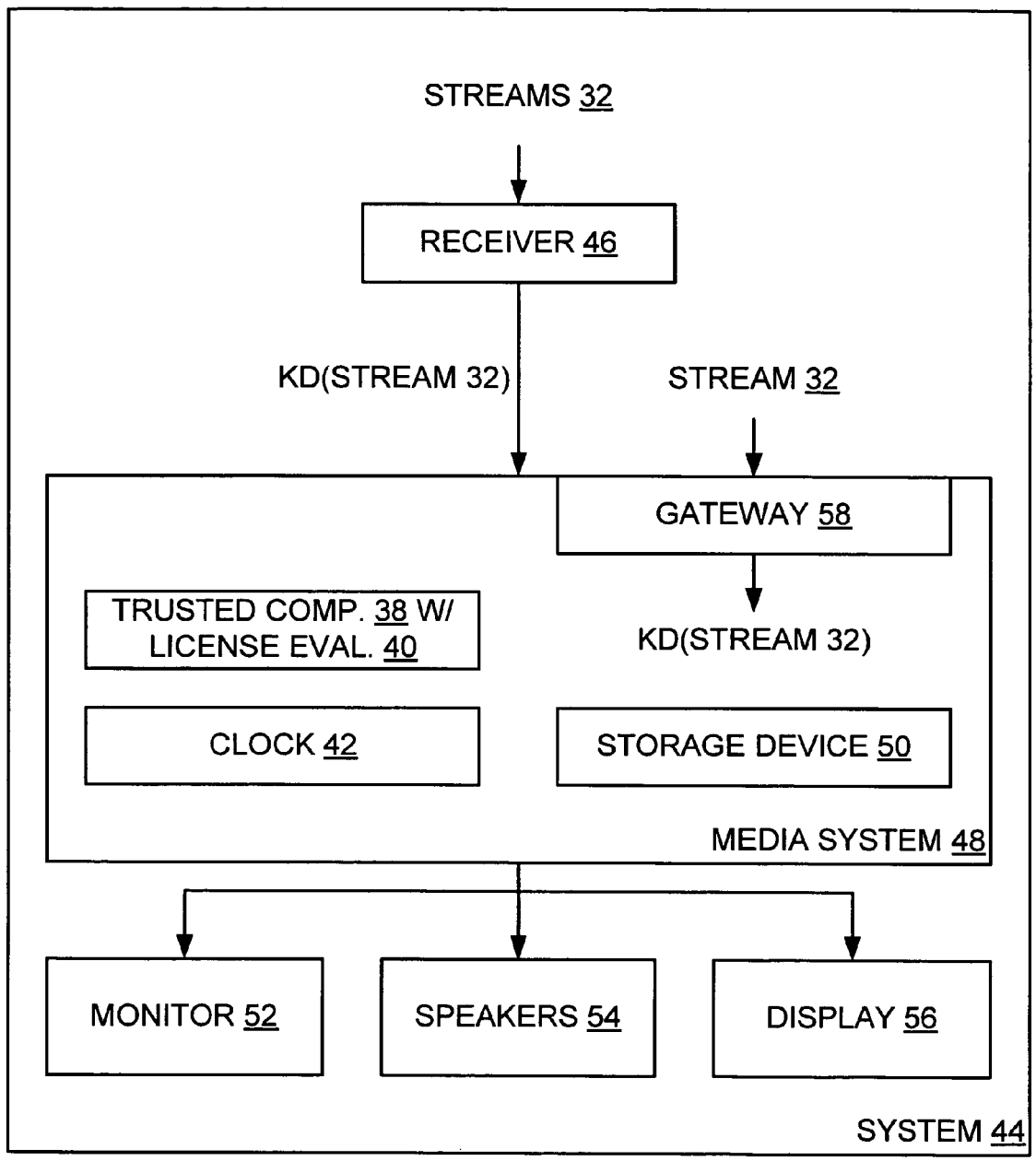
FIG. 4 is a block diagram showing an example of the trust-based system of FIG. 3, and in particular shows a receiver forwarding an encrypted stream of content to a media system for rendering thereby in accordance with various embodiments of the present invention.

Turning now to FIG. 4, a system 44 for receiving and handling multimedia content 32 is shown. As should be evident, such system 44 is particularly suited for handling an input signal comprising multiple streams of multimedia content 32, such as for example a television signal from a multichannel distributor. However, such will be system 44 may also handle other input signals without departing from the spirit and scope of the present invention.

In the system 44, the aforementioned input signal as provided by the distributor thereof is applied to a receiver 46 which may be any appropriate receiver without departing from the spirit and scope of the present invention, presuming of course such receiver can performs the functions set forth herein. For example, the receiver 46 may be a Uni-Directional Cable Receiver (UDCR) such as is being developed to receive a digital cable television signal and forward same for further digital processing including rendering of content 32 therein. As may be appreciated, the receiver 46 upon being so commanded tunes one of the multiple streams of multimedia content 32 from the input signal and forwards same for further processing. In addition, the receiver 46 prior to forwarding the tuned stream of content 32 may if necessary convert such stream 32 from a native format to a format more amenable for such further processing.

As envisioned, each of the multiple streams of multimedia content 32 in the input signal may or may not be encrypted. Upon tuning a particular stream of content 32 within the input signal, then, the receiver 46 decrypts such stream if encrypted and re-encrypts same in a manner that will be set forth in more detail below, or merely encrypts the stream if not encrypted, again in a manner that will be set forth in more detail below. As was alluded to above, the receiver 46 encrypts the stream of content 32 as part of ensuring that the stream is RM-protected. Thus, the stream of content 32 is not available to be redistributed in an unprotected form.

As also shown in FIG. 4, a media system 48 is provided to receive the encrypted stream of content 32 from the receiver 46 and further process same. Presumably, the media system 48 commanded the receiver 46 to tune the particular stream of content 32 from within the input signal, perhaps upon receiving a corresponding command from a user, although it maybe appreciated that such a command may be initiated by other sources without departing from the spirit and scope of the present invention. At any rate, upon receiving the stream of content 32 from the receiver 46, the media system 48 stores same in an appropriate storage device 50 for retrieval and rendering, either immediately or upon some time delay. Upon rendering of the stream 32, the media system 48 forwards appropriate signals to one or more output devices such as one or more monitors 52, speakers 54, other displays 56, and the like.

Inasmuch as the stored stream 32 is in the RM-protected form, the media system 48 includes RM components such as the trusted component 38, license evaluator 40, and clock 42 of FIG. 3. Thus, upon retrieving a particular stream 32, the media system 38 renders same, but only in accordance with a corresponding license 36. Accordingly, the encrypted stream 32 is decrypted and rendered only in if such license 36 so allows, and with the content key (CK) set forth in the license 36. Note that inasmuch as the encrypted stream 32 is stored at least temporarily on the (first) media system 48, a user thereof may in theory copy same to another (second) media system 48 for rendering thereby. However, inasmuch as the stream is encrypted and decryptable only according to the license 36, and inasmuch as the license 36 is tied to the first media system 48, such license 36 may not be employed by the second media system 48.

As should be understood, though, it may be the case that the first media system 48 can issue a sub-license 36 for the copied stream 32 to the second media system 48, presuming the first media system 48 is in fact capable of doing so and the license 36 so allows. If so, the sub-license 36 as tied to the second media system 48 can in fact be employed by the second media system 48 to render the stream 32.

Still referring to FIG. 4, it is seen that in addition to or as an alternative to receiving a stream 32 from the receiver 46, the media system 48 may additionally receive streams 32 from other sources, either directly or indirectly. Such other sources may for example comprise an NTSC input signal, an ATSC input signal, and the like. As seen, for each of at least some input signals received directly, it may be the case that the media system 48 includes either a hardware or software gateway 58 that acts in the manner of the receiver 46 to convert a stream 32 within the received input signal to an encrypted format more amenable to the media system 48 as necessary.

Payloads in Stream 32 Formed on Intrinsic Partitions

Figure 5:
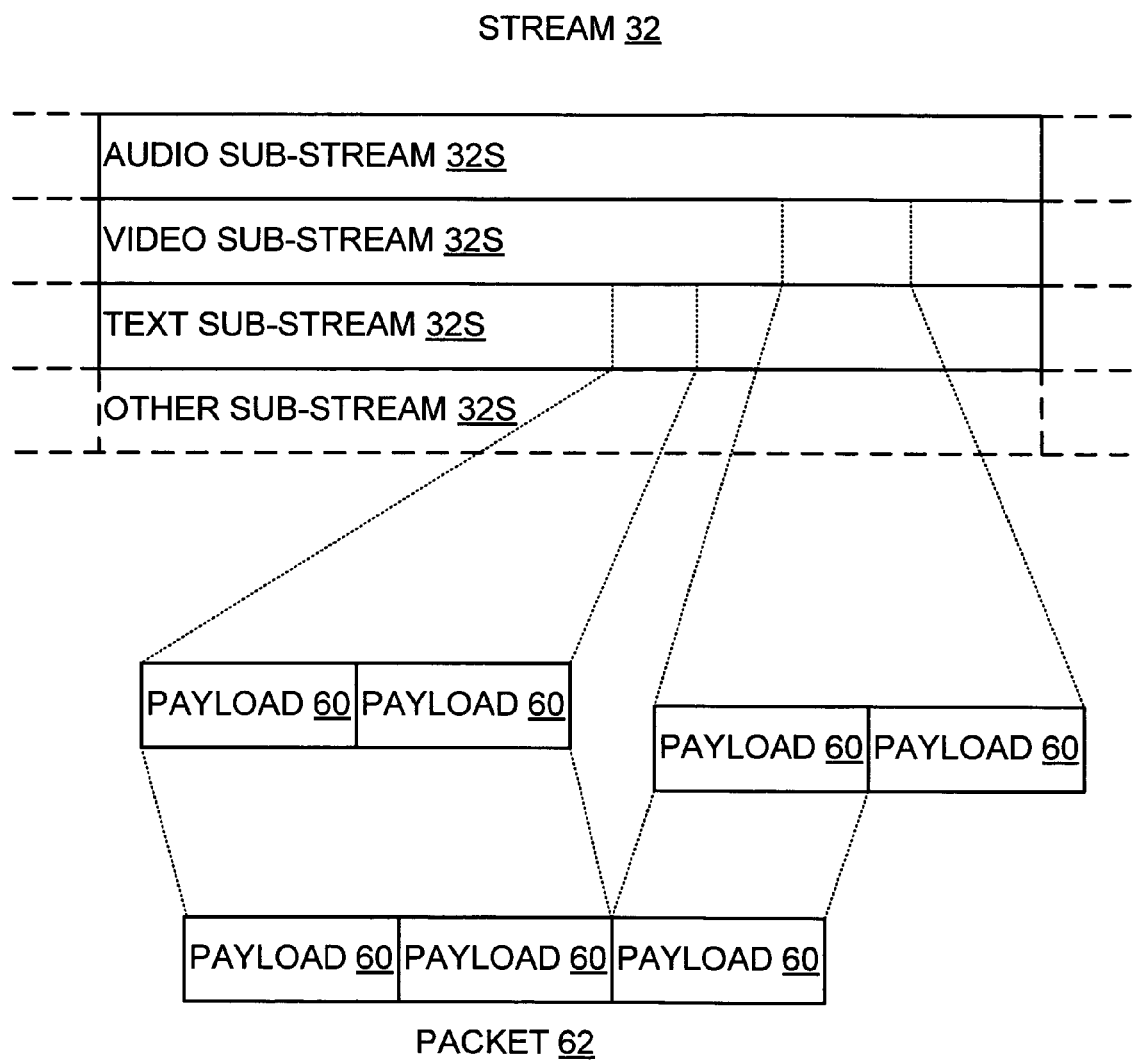
FIG. 5 is a block diagram showing a stream such as may be employed by the receiver of FIG. 4 in accordance with one embodiment of the present invention.

Turning now to FIG. 5, and as was set forth above, a typical stream 32 includes multiple sub-streams 32s, such as for example one or more audio sub-streams 32s, one or more video sub-streams 32s, one or more text sub-streams 32s, etc., where at least some of the sub-streams 32s are intended to be synchronized with one another and rendered with one another. As is known, when forming the stream 32 for transmission, either by the receiver 46, a source providing the stream 32 to the receiver 46, a source providing the stream 32 directly to the media system 48, or otherwise, each such sub-stream 32s is divided into payloads 60, each payload 60 is encrypted if necessary and tagged with appropriate identifying information, payloads 60 are formed into packets 62, each packet 62 is tagged with appropriate identifying information, and the packets 62 are what is in fact transmitted. Forming such stream 32 into such packets 62 is known or should be apparent to the relevant public and therefore need not be set forth herein in any detail. Accordingly, any appropriate method of so forming such stream 32 into such packets 62 may be employed without departing from the spirit and scope of the present invention.

As should be appreciated, with such packets 62, the media system 48 or the like recreates the stream 32 from the packets 62 by essentially reversing the process of packet formation. In essence, then, each sub-stream 32s is re-created by locating the payloads 60 thereof from the packets 62 of the stream 32, decrypting the located payloads 60, and sequentially organizing such decrypted payloads 60. As each sub-stream 32s is re-created, the stream 32 is rendered by rendering each sub-stream 32s in a synchronous manner. As before, re-creating such stream 32 from such packets 62 is known or should be apparent to the relevant public and therefore need not be set forth herein in any detail. Accordingly, any appropriate method of so re-creating such stream 32 from such packets 62 may be employed without departing from the spirit and scope of the present invention.

As was set forth above, each payload 60 from a particular sub-stream 32s has a start boundary and an end boundary, and each sub-stream 32s is composed of a number of sequentially organized digital blocks of information, such as for example, frames of video in a video sub-stream 32s, bytes of text in text sub-stream 32s, etc. As was also set forth above, in the prior art, during formation of the payloads 60, the boundaries of any particular payload 60 were determined rather arbitrarily, and typically based on external factors such as a determined bit-rate for the stream 32. Thus, and for example, it typically was the case that a video sub-stream 32s was divided into payloads 60 such that each of the start boundary and end boundary of each payload 60 was as some point in the middle of a video frame, and not at a partition between video frames.

Again, although such arbitrary boundaries for payloads 60 are not especially troublesome during normal transmission and rendering of a stream 32 by the media system 48 or the like, it is to be appreciated that such arbitrary boundaries can cause considerable difficulty when the stream 32 is to be manipulated, such as for example when a first media system 48 re-transmits the stream 32 to a second media system 48, or when a media system 48 is being operated to perform an operation on each logical block of a sub-stream 32s of the stream 32.

Accordingly, and in one embodiment of the present invention, each payload 60 is not formed from a sub-stream 32s of a stream 32 by defining an arbitrarily bounded portion of the sub-stream 32s and then encrypting the portion to produce the data for the payload 60. Instead, in one embodiment of the present invention, a non-arbitrarily bounded logical block of the sub-stream 32s is defined and encrypted, and the encrypted logical block may then be divided into portions to produce the corresponding data for each of one or more payloads 60. Thus data of the payloads 60 of the logical blocks need not necessarily be decrypted to manipulate such logical blocks, unless of course such manipulation requires the data to be in a decrypted form.

The size and definition of each logical block of a particular sub-stream 32s can be any size and definition without departing from the spirit and scope of the present invention. Significantly, though, each logical block is based on partitions intrinsic to the sub-stream 32s. Again, such intrinsic partitions are specific to the type of content in a sub-stream 32s, and can be the dividers between frames in the case of video, bytes in the case of text, audio samples in the case of audio, etc.

Likewise, the number of payloads 60 produced from a particular encrypted logical block can be any number without departing from the spirit and scope of the present invention. For example, in the case of a text sub-stream 32s with bytes of text, the logical block may be a byte, 50 bytes, 512 bytes, a kilobyte, 10 kilobytes, or the like, and the number of payloads 60 produced from such a logical block can be 1, 10, 40, 128, 1024, or the like. Similarly, in the case of a video sub-stream 32s with frames of video, the logical block may be a frame, a pair of frames, 10 frames, or the like, and the number of payloads 60 produced from such a logical block can be 1, 3, 7, 10, 40, or the like.

Figure 6:
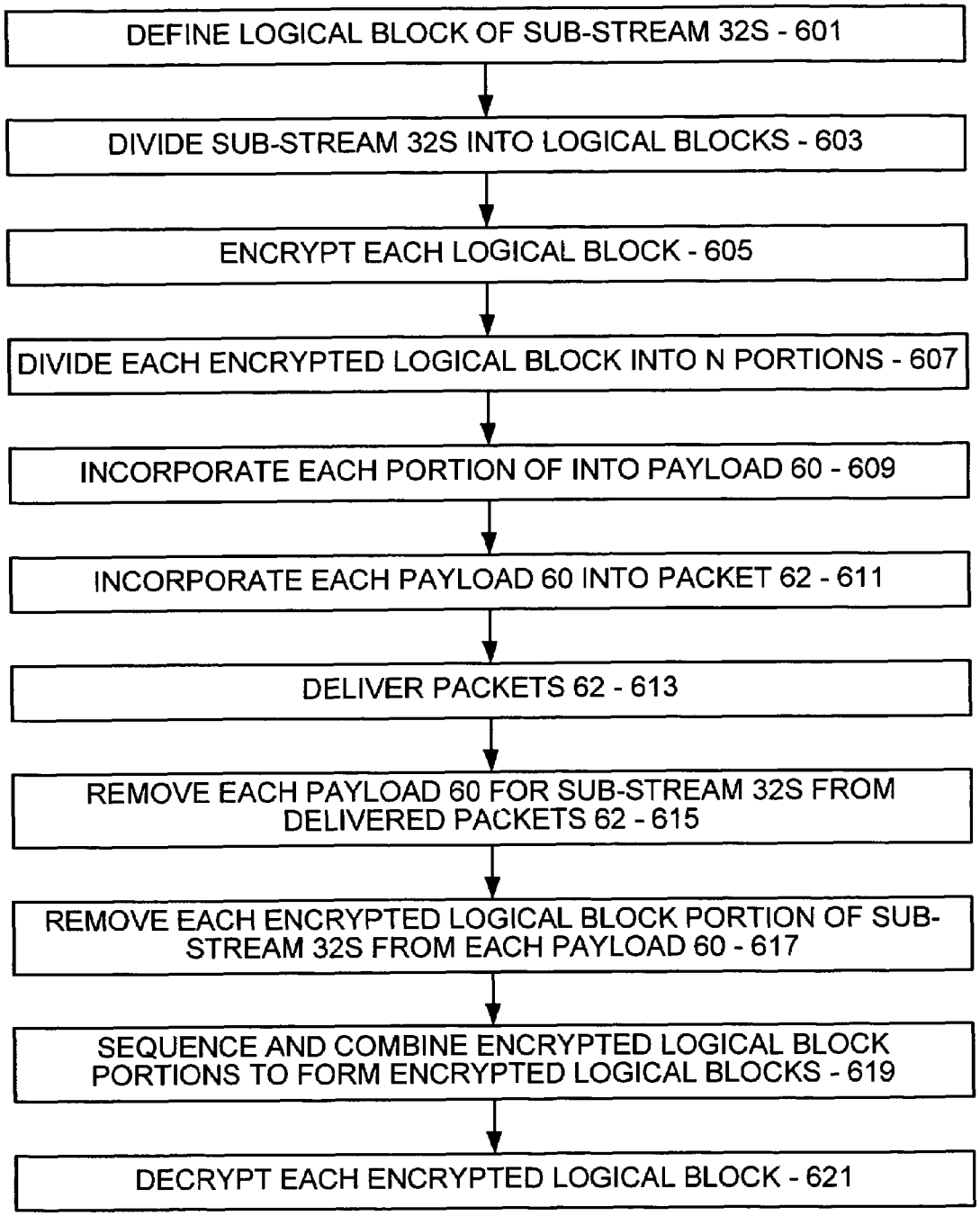
FIG. 6 is a flow diagram showing key steps performed in connection with transmitting and re-constructing the stream of FIG. 5 in accordance with one embodiment of the present invention, where each logical block of each sub-stream of the stream is first encrypted and then divided into payloads.

Turning now to FIG. 6, it is seen that a method for producing the payloads 60 from a particular sub-stream 32s is shown. Preliminarily, a logical block of the sub-stream 32s is defined (step 601) based on appropriate criteria. Remembering that each logical block is to be encrypted as a unit, the logical block should be defined at least partially based on a consideration of a size of the logical block that would be amenable for such encryption. For example, a particular encryption algorithm may operate better on a logical block that is about 1 kilobyte as opposed to a logical block that is about 10 bytes. However, remembering that it may be more optimal for a media system 48 or the like to manipulate particular-size pieces of a sub-stream 32s, the logical block should also be defined at least partially based on a consideration of such particular-size pieces. For example, manipulation of frames of video in a video sub-stream 32s may best be performed if each logical block is indeed a video frame.

At any rate, once a logical block is defined as at step 601, the sub-stream 32s is divided into such logical blocks (step 603), and each logical block is then encrypted (step 605). Thereafter, each encrypted logical block may itself be divided into a number of portions if so desired (step 607). As maybe appreciated, the number of portions that an encrypted logical block is divided into can be any number without departing from the spirit and scope of the present invention, if indeed such division takes place, and may indeed vary from block to block. For example, if it is deemed advisable that each payload 60 should have about 1 kilobyte of data or so and a particular encrypted logical block is about 10 kilobytes, then it may be that such block is divided into 9, 10, or 11 pieces of data.

Once divided, each portion of the encrypted logical block is then incorporated into a payload 60 as the data thereof (step 609). Of course, each payload 60 is then incorporated into a particular packet 62 (step 611), and the packets 62 may then be delivered as part of a stream 32 including the sub-stream 32s (step 613).

To reconstitute a particular sub-stream 32s of the stream 32 from the packets 62, and as should now be appreciated, each payload 60 for the sub-stream 32s is removed from the packets 62 (step 615), and each encrypted logical block portion from the sub-stream 32s is removed from each payload 60 (step 617). The encrypted logical block portions may then be correctly sequenced and combined to form the encrypted logical blocks (step 619), and each such encrypted logical block may then be decrypted as appropriate (step 621). Note that re-constituting a particular sub-stream 32 from packets 62 is known or should be apparent to the relevant public and therefore need not be set forth herein in any detail. Accordingly, any appropriate method of so re-constituting such sub-stream 32 from such packets 62 may be employed without departing from the spirit and scope of the present invention.

Note that it may not always be necessary for a media system 48 or the like to perform all of steps 615-621 when manipulating a stream 32. For example, decrypting as at step 621 may not be necessary, and sequencing and combining the encrypted logical block portions as at step 619 may also not be necessary in all circumstances. Critically, inasmuch as each logical block of a sub-stream 32s is encrypted prior to being (possibly) divided into portions that are formed into payloads 60, such sub-stream 32s may be manipulated by manipulating the encrypted logical block portions thereof, and decryption of such encrypted logical block portions can be avoided in at least some instances.

Architecture for Defining Protection of Multiple Sub-Streams 32s in Stream 32

As was pointed out above, and with regard to a stream 32 of content comprised of multiple sub-streams 32s, it would be advantageous to be able to apply different rights management and protection schemes to each sub-stream 32s of the stream 32. For example, in a stream 32 with a video sub-stream 32s, an audio sub-stream 32s, a text sub-stream 32s, and a metadata sub-stream 32s, it may be advantageous to have the video sub-stream 32s protected by a first scheme and according to a first license 36, to have the audio sub-stream 32s protected by the first scheme but according to a second license 36, to have the text sub-stream 32s protected by a second scheme, and to not have the metadata sub-stream 32s protected by any scheme whatsoever.

Presumably, the mechanics of in fact applying such schemes to the sub-streams 32s of the stream 32 in the manner desired are known or should be apparent to the relevant public and therefore need not be set forth herein in any detail. However, and significantly, an architecture describing the particular application of such schemes to such sub-streams 32s is necessary so that such a description can be provided to an entity such as a media system 48 or the like that is to reconstitute or at least manipulate such sub-streams 32s.

Figure 7:
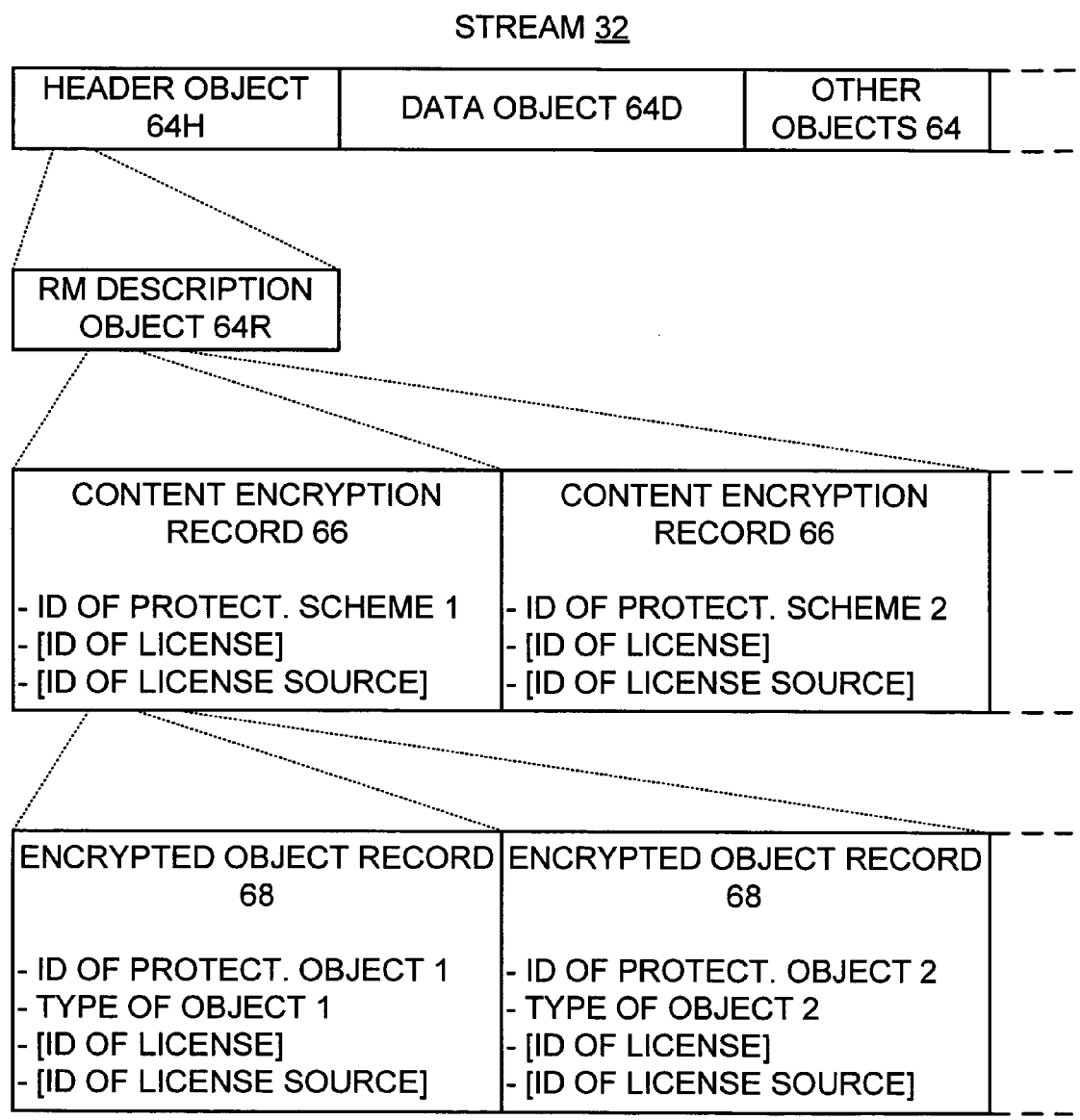
FIG. 7 is a block diagram showing an architecture employed to specify for the stream of FIG. 5 the particular rights management content protection for each sub-stream of the stream in accordance with one embodiment of the present invention.

In one embodiment of the present invention, then, and turning now to FIG. 7, an architecture describing the application of rights management (RM) and protections schemes to sub-streams 32s of a stream is shown. Preliminarily, and as should be appreciated, it is typical although not absolutely necessarily that the stream 32s include such RM description so that a media system 48 or the like receiving the stream 32 need not refer elsewhere for such description. For example, and as shown, the stream 32 may be at least conceptually organized into a plurality of objects 64 including a header object 64h and a data object 64d, where the header object 64h includes various data and metadata relating to the stream 32, and the data object 64d includes the actual data representative of the stream 32, including the constituent sub-streams 32s thereof and other related objects. As may be appreciated, then, such header object 64h in particular may include the RM description in an appropriate arrangement.

In one embodiment of the present invention, the RM description is set forth within the header object 64h as an RM description object 64r. As seen, the RM description object 64r principally includes for each protection scheme employed in connection with the stream 32 a content encryption record 66 describing such protection scheme. Thus, with regard to the aforementioned example where a stream 32 has a video sub-stream 32s protected by a first scheme and according to a first license 36, an audio sub-stream 32s protected by the first scheme but according to a second license 36, a text sub-stream 32s protected by a second scheme, and an unprotected metadata sub-stream 32s, it would be the case that the RM description object 64r for such stream 32 includes a first content encryption record 66 describing the first scheme and a second content encryption record 66 describing the second scheme. Such RM description object 64r might also have a third content encryption record 66 relating to the unprotected metadata sub-stream 32s, although such a third content encryption record 66 is likely unnecessary since such metadata sub-stream 32s is indeed unprotected.

In one embodiment of the present invention, each content encryption record 66 principally includes with regard to the protection scheme thereof an identification of the protection scheme and a number of encrypted object records 68, where each encrypted object record 68 relates to a particular object protected according to the identified protection scheme of the content encryption record 66, such as for example a particular sub-stream 32s, a portion of a particular sub-stream 32s, or the like. Thus, with regard to the aforementioned example where the stream 32 has the video sub-stream 32s protected by the first scheme and according to a first license 36, the audio sub-stream 32s protected by the first scheme but according to a second license 36, the text sub-stream 32s protected by the second scheme, and the unprotected metadata sub-stream 32s, it would be the case that the first content encryption record 66 describing the first scheme would include an identification of the first scheme, a first encrypted object record 68 relating to the video sub-stream 32s as protected by the identified first scheme, and a second encrypted object record 68 relating to the audio sub-stream 32s as protected by the identified first scheme. Likewise, the second content encryption record 66 describing the second scheme would include an identification of the second scheme and only a single encrypted object record 68 relating to the text sub-stream 32s as protected by the identified second scheme.

As seen in FIG. 7, each encrypted object record 68 with regard to a particular object protected according to a particular protection scheme includes therein an identification of the particular object as the particular object resides in the data object 64d and a type of the object, such as for example a sub-stream 32s, a portion of a sub-stream 32s, etc. In addition, the encrypted object record 68 may also include with regard to the identified object related information, such as an identification of a license 36 to render the object, or an identification of where to obtain such a license 36. Alternatively, if such license-type information is common to all encrypted object records 68 of a particular content encryption record 66, such license-type information may be included with such content encryption record 66.

Figure 8:
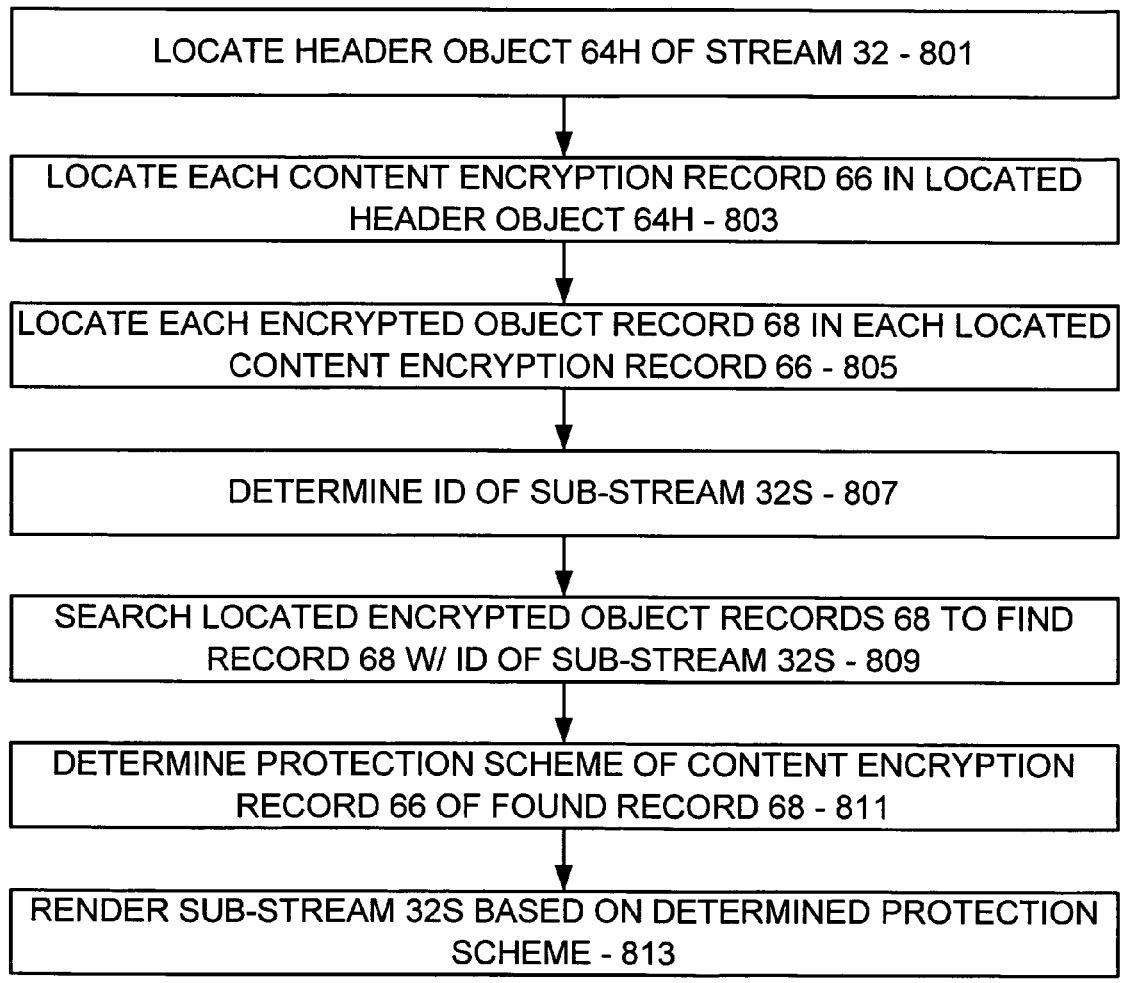
FIG. 8 is a flow diagram showing key steps performed in rendering each protected sub-stream in accordance with the architecture of FIG. 7 in accordance with one embodiment of the present invention.

As may now be appreciated, with the architecture set forth in FIG. 7, and referring now to FIG. 8, a rendering device such as a media system 48 renders a particular stream 32 by first locating the header object 64h of the stream 32 (step 801), then locating each content encryption record 66 in the header object 64h (step 803), and then locating each encrypted object record 68 of each located content encryption record 66 in the header object 64h (step 805). With regard to a particular sub-stream 32s that is RM-protected, then, the rendering device determines an identification of the sub-stream 32s (step 807) and searches through the located encrypted object records 68 to find a record 68 having such identification of such sub-stream 32s (step 809). Thereafter, the rendering device determines the protection scheme of the content encryption record 66 of the found record 68, where such determined protection scheme is employed to protect the sub-stream 32s (step 811), and proceeds to render such sub-stream 32s in accordance with such protection scheme (step 813).

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided by which payloads 60 from a sub-stream 32s of content are defined according to non-arbitrary boundaries. Thus, the payloads 60 are defined according to rational boundaries that are intrinsic to the underlying sub-stream 32s, and the sub-stream 32s can be manipulated without necessarily requiring the stream 32 to be decrypted and re-encrypted.

Also in the present invention, an architecture is provided that may be employed so that each sub-stream 32s within a stream 32 may be protected according to a particular rights management content protect system and a particular content key (CK). The architecture allows specifying within the stream 32 the particular rights management content protection scheme for each sub-stream 32s of the stream 32 with a header object 64h that is included with the stream 32 and that may be interpreted and employed when rendering the stream 32.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of rendering a stream of content having at least one rights management (RM) protected sub-stream therein, each RM-protected sub-stream being protected according to a particular protection scheme, the method comprising:

receiving the stream including a data object including data representative of each sub-stream and a header object including an RM description object, the RM description object including at least one content encryption record, each content encryption record corresponding to a particular protection scheme and including with regard to the protection scheme thereof an identification of the protection scheme and at least one encrypted object record, each encrypted object record relating to a particular sub-stream protected according to the identified protection scheme of the content encryption record thereof and including an identification of the particular sub-stream;

locating the header object of the stream, each content encryption record in the header object, and each encrypted object record of each content encryption record in the header object; and for each RM-protected sub-stream of the stream:
  determining an identification of the sub-stream;
  finding a located encrypted object record with the determined identification of the sub-stream;
  determining the protection scheme of the content encryption record of the found encrypted object record; and
  rendering the sub-stream in accordance with the determined protection scheme.

2. The method of claim 1 wherein each encrypted object record further includes an identification of a type of the sub-stream.

3. The method of claim 1 wherein each encrypted object record further includes at least one of an identification of a license to render the object and an identification of where to obtain such a license.

4. The method of claim 1 wherein each content encryption record further includes at least one of an identification of a license to render all sub-streams protected according to the protection scheme of such content encryption record and an identification of where to obtain such a license.

5. A computer-readable medium having stored thereon computer data representative of a stream of content having multiple rights management (RM) protected sub-streams therein, each RM-protected sub-stream being protected according to a different particular protection scheme, the stream including a data object including data representative of each sub-stream and a header object including an RM description object, the RM description object including at least one content encryption record, each content encryption record corresponding to a particular protection scheme and including with regard to the protection scheme thereof an identification of the protection scheme and at least one encrypted object record, each encrypted object record relating to a particular sub-stream protected according to the identified protection scheme of the content encryption record thereof and including an identification of the particular sub-stream, wherein for each RM-protected sub-stream of the stream, an identification of the sub-stream is employed to find a corresponding encrypted object record, and wherein the protection scheme of the content encryption record of the found encrypted object record is employed to render the sub-stream.

6. The medium of claim 5 wherein each encrypted object record further includes an identification of a type of the sub-stream.

7. The medium of claim 5 wherein each encrypted object record further includes at least one of an identification of a license to render the object and an identification of where to obtain such a license.

8. The medium of claim 5 wherein each content encryption record further includes at least one of an identification of a license to render all sub-streams protected according to the protection scheme of such content encryption record and an identification of where to obtain such a license.

* * * * *